Figure 1:
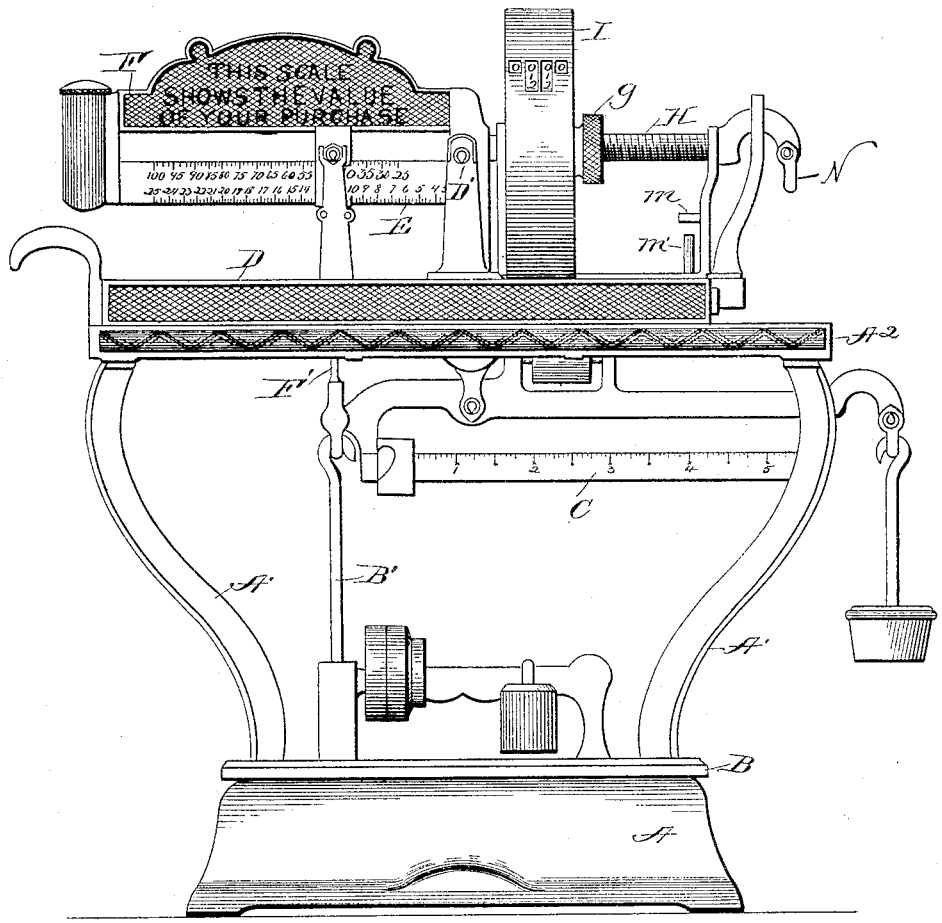

(No Model.) 2 Sheets—Sheet 1.

O. O. OZIAS.
COMPUTING SCALE.

No. 581,173. Patented Apr. 20, 1897.

(No Model.) 2 Sheets—Sheet 2.
O. O. OZIAS.
COMPUTING SCALE.
No. 581,173. Patented Apr. 20, 1897.
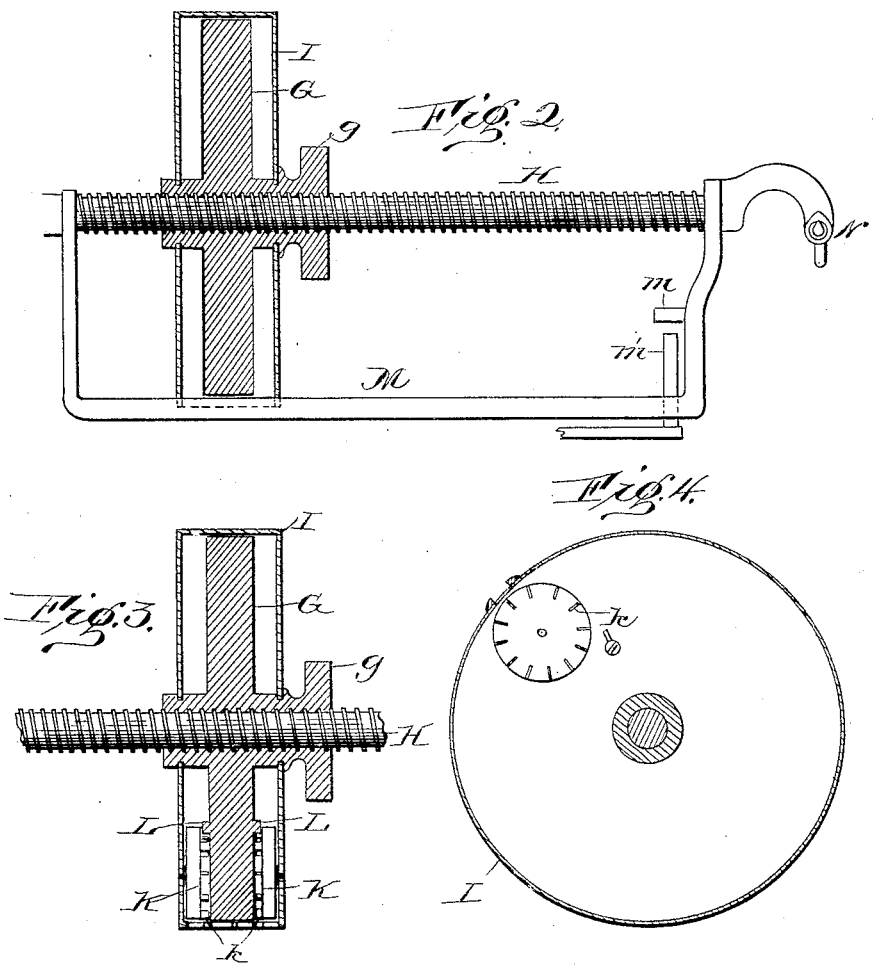
Witnesses:
J. M. Fowler Jr.
Alex Stewart
Inventor:
Orange O. Ozias,
by Church & Church
his Attorneys.

UNITED STATES PATENT OFFICE.

ORANGE O. OZIAS, OF DAYTON, OHIO.

COMPUTING-SCALE.

SPECIFICATION forming part of Letters Patent No. 581,173, dated April 20, 1897.

Application filed April 11, 1896. Serial No. 587,159. (No model.)

*To all whom it may concern:*

Be it known that I, ORANGE O. OZIAS, of Dayton, in the county of Montgomery, State of Ohio, have invented certain new and useful Improvements in Computing-Scales; and I do hereby declare the following to be a full, clear, and exact description of the same, reference being had to the accompanying drawings, forming a part of this specification, and to the letters of reference marked thereon.

This invention relates to improvements in computing-scales, and particularly, though not exclusively, to that class of computing-scales wherein the pivot of the beam is movable with relation to the connection with the levers for supporting the load; and the object of the invention is to provide a structure in which the computations of value will be presented to the user at a single point and in which but a very short range of movement of the movable poise is necessary to secure a balance at any rate per unit within the capacity of the scale.

Referring to the accompanying drawings, Figure 1 is a front elevation of a computing-scale of the above-mentioned type and embodying the present invention. Fig. 2 is a vertical section through the right-hand end of the computing-beam. Fig. 3 is a similar section through the movable weight and showing the multiplying-wheels for the computations of value. Fig. 4 is a diagrammatic end elevation of the movable weight and casing, showing one of the multiplying-wheels in outline and its operating-tooth on the weight.

Like letters of reference in the several figures indicate the same parts.

The scale shown in the accompanying drawings in order to illustrate the application of my present invention is of the ordinary type at present on the market and consists of a base A, having standards A', and an elevated base $A^2$. Above the base A there is supported the usual platform B, upon which the goods to be weighed are placed, and the levers supporting this platform are connected by the rod B' with the weighing-beam C. A longitudinally-movable carriage D is mounted on the elevated base $A^2$ and is adapted to support by centrally-arranged pivots D' a computing-beam E, upon which a head-block F rides and is adapted to be connected by a rod F' with the upper end of the rod B'.

The head-block F is adapted to be held against movement longitudinally of the base $A^2$ when the carriage is shifted, and consequently the position of the fulcrums of the head-block and beam may be shifted with relation to each other to vary the ratio of leverage exerted by the beam, all as is well known to those skilled in the art. The beam E is preferably graduated to indicate unit-prices, and the head-block F registers with such graduations, as shown, to indicate the rate-price of the article being weighed.

In order to balance up the weight of the article in making the computations of value, I provide in the present instance a relatively heavy rotary weight G, adapted by its rotation to be moved longitudinally of the beam, for which purpose it is preferably mounted on a screw-shaft or beam end H, although any other means for securing such longitudinal movement by the rotation of the weight may be employed.

As just stated, the weight is preferably mounted directly upon the screw-shaft, and as a convenient means for turning it the weight is provided at one side with a milled disk or handpiece $g$. Thus when the scale has been set at the desired rate per pound the weight G may be rotated until it is moved out the proper distance to balance the article being weighed, and by providing the periphery of said weight with cost graduations properly proportioned with relation to the price per unit graduations the cost price of an article balanced by the weight in any position of adjustment will be advanced or turned into view at the desired point or made to register with an indicator located at such point, as will be readily understood.

I prefer to mount the weight in a casing I, movable longitudinally with the weight, but held against rotation by a guide M on the beam, and to form in said casing an aperture or apertures through which the cost indications will appear successively as the weight is rotated. Thus the person using the scale has the cost price indicated clearly in figures before him through said apertures when the article being weighed is balanced.

For convenience, two sets of graduations are formed on the weight, the graduations on one side indicating the cost price of articles at rates indicated by the graduations on the lower edge of the beam E and the graduations on the other side indicating cost prices of articles at rates indicated by the graduations at the upper edge of the beam E, and in order that the graduations and figures may be of a size to be readily legible and also to increase the capacity of the scale I prefer to employ a multiplying-gearing operated by the weight and adapted to present at the apertures in the casing suitable multiples of the indications on the weight itself. For instance, if the graduations on the weight at one side ran up to nine cents and extended entirely around the circumference of the weight, when said weight has been rotated beyond this point a second figure will appear beside the graduation on the weight to indicate "10," and so on up to "20," and when a further graduation would appear to indicate "20," &c., up to the capacity of the scale. In the preferred arrangement for accomplishing this end multiplying-wheels K are supported by the casing immediately in rear of the sight-openings therein and provided on their peripheries with indications or figures, as before explained. These multiplying-wheels have suitable depressions or teeth K, with which teeth L on the weight are adapted to coöperate and advance the multiplying-wheel one space for each rotation of the weight. These multiplying-wheels are located on each side of the weight or in such proper proximity thereto as will most conveniently enable the graduations or indications on the periphery of the weight to be read in connection therewith.

The frame M at one end is provided with a projection m, with which a pin m' is adapted to coöperate in order to hold the beam in horizontal position while being shifted from one position of adjustment to another, and at the extreme end the beam is provided with the usual pendulous yoke N, to which the counterbalance or pendant for supplemental weights may be hung.

In operation the scale will be in balance when the movable weight and casing have been shifted to the left-hand extreme of their movement, and if the beam is set for the proper rate per unit and the goods placed on the platform the user, in order to determine the cost price or value of the article, will proceed to rotate the weight until it has moved far enough to the right to secure the desired balance, at which point the cost of the article at that rate per unit will appear through the sight-opening in the casing. With such an arrangement (it will be observed there is no multiplicity of figures presented to confuse the eye of the user) the balance may be secured much more easily and, what is of greater importance, a relatively heavy weight may be employed and have but a short range of movement in order to attain the desired result.

Obviously the rotary weight and multiplying-wheels may be employed to secure a balance in other forms of scale than that illustrated, and hence I do not wish to be limited herein to the specific form of scale shown and described, although, as will be apparent to those skilled in the art, the arrangement is especially advantageous in a scale having the characteristics hereinbefore set forth.

In the specific illustration shown in this case the figures on the right-hand multiplying-wheel indicate dollars and the figures and graduations on the right-hand side of the weight indicate cents, and in reading these figures, of course, if it is desired that the dollars be read first the figures must be read from right to left.

Having thus described my invention, what I claim as new is—

1. In a computing-scale, the combination with the pivoted beam and the longitudinally-movable and rotary weight or poise mounted on said beam, of the rotary multiplying-wheels having peripheral graduations, teeth on said multiplying-wheels, teeth on the rotary weight for rotating the multiplying-wheels on their centers and a handpiece for rotating the weight; substantially as described.

2. In a computing-scale, the combination with the pivoted beam and the screw-shaft carried thereby, of the rotary and longitudinally-movable weight or poise carried by said screw-shaft and multiplying-wheels controlled by the rotation of the weight, said multiplying-wheels and weight having peripheral graduations; substantially as described.

3. In a computing-scale, the combination with the pivoted beam and the screw-shaft carried thereby of the rotary longitudinally-movable weight or poise carried by the screw-shaft, the multiplying-wheels movable longitudinally with the rotary weight, but held against rotation therewith and coöperating teeth on the multiplying-wheels and weight respectively; substantially as described.

4. In a computing-scale, the combination with the pivoted beam and screw-shaft carried thereby, of the rotary and longitudinally-movable weight or poise carried by the screw-shaft, the casing movable longitudinally with said weight, but held against rotation therewith and the multiplying-wheel journaled in the casing with teeth on said wheel and weight respectively, whereby when the weight is rotated said teeth will engage and advance the multiplying-wheel a proper proportionate distance; substantially as described.

5. In a computing-scale, the combination with the pivoted beam, the screw-shaft carried thereby and the rotary and longitudinally-movable weight or poise carried by the shaft and having peripheral graduations, of the casing surrounding said weight, a frame for holding said casing against rotation, a multiplying-wheel journaled in the casing, coöperating teeth on said wheel and weight respectively and a handpiece for turning the weight; substantially as described.

6. In a computing-scale, the combination with the base, platform, pivoted beam, and connection between said beam and platform, with means for shifting the relation of the said connection and pivot of the beam, of a relatively heavy longitudinally-movable and rotary weight or poise carried by said screw-shaft and having peripheral graduations for indicating cost prices and a handpiece for turning said weight to shift the same longitudinally; substantially as described.

7. In a computing-scale, the combination with the base, platform, pivoted beam and connection between said beam and platform with means for shifting the relative positions of the beam-pivot and platform connection to vary the price per unit, of a screw-shaft on the beam, a rotary and longitudinally-movable weight carried by the shaft, a casing surrounding said weight and having sight-openings therein, a guide on the beam for preventing the rotation of the casing, a multiplying-wheel journaled in the casing with coöperating teeth on the weight and wheel respectively whereby the multiplying-wheel is rotated by the rotation of the weight and a handpiece for rotating the weight; substantially as described.

8. In a computing-scale, the combination with the pivoted beam, the screw-shaft carried thereby and the rotary and longitudinally-movable weight carried by said shaft and having two sets of peripheral graduations, of two multiplying-wheels driven by said weight and having peripheral graduations indicating multiples of the graduations respectively on the weight; substantially as described.

9. In a computing-scale, the combination with the pivoted beam, the screw-shaft carried thereby a rotary and longitudinally-movable weight carried by the screw-shaft, said weight having two sets of peripheral graduations, of the casing movable longitudinally with the weight and held against rotation, the multiplying-wheels journaled in the casing and having sets of graduations constituting multiples of the respective graduations on the weight and teeth on the weight and multiplying-wheels respectively, whereby the multiplying-wheels are rotated by the rotation of the wheels; substantially as described.

ORANGE O. OZIAS.

Witnesses:
L. KREIDER,
B. A. COOKE.